US011743265B2

(12) United States Patent
Lakunishok et al.

(10) Patent No.: US 11,743,265 B2
(45) Date of Patent: *Aug. 29, 2023

(54) METHOD AND SYSTEM FOR DELEGATING CONTROL IN NETWORK CONNECTION ACCESS RULES USING MULTI-FACTOR AUTHENTICATION (MFA)

(71) Applicant: ZERO NETWORKS LTD., Holon (IL)

(72) Inventors: Benny Lakunishok, Holon (IL); Gil David, Zichron Yaakov (IL); Yossef Jossef Harush, Bat Yam (IL)

(73) Assignee: ZERO NETWORKS LTD., Holon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,012

(22) Filed: May 17, 2021

(65) Prior Publication Data

US 2021/0273945 A1 Sep. 2, 2021

Related U.S. Application Data

(63) Continuation-in-part of application No. 16/828,426, filed on Mar. 24, 2020, now Pat. No. 11,012,433.

(Continued)

(51) Int. Cl.
*H04L 9/40* (2022.01)
*G06F 21/31* (2013.01)
*G06F 21/55* (2013.01)

(52) U.S. Cl.
CPC ........ *H04L 63/102* (2013.01); *H04L 63/0263* (2013.01); *H04L 63/08* (2013.01);

(Continued)

(58) Field of Classification Search
CPC ... H04L 63/08; H04L 63/0838; H04L 63/102; H04L 63/0263; H04L 63/029;

(Continued)

(56) References Cited

U.S. PATENT DOCUMENTS 7,631,350 B2 * 12/2009 Parry .................... H04L 63/029
713/153
10,050,938 B2 8/2018 Moskow
(Continued)

FOREIGN PATENT DOCUMENTS

FR 2782873 A1 * 3/2000 ............. H04L 29/06

*Primary Examiner* — Jayesh M Jhaveri
(74) *Attorney, Agent, or Firm* — Pearl Cohen Zedek Latzer Baratz LLP

(57) ABSTRACT

A method and a system for modifying network connection access rules using multi factor authentication (MFA) are provided herein. The method may include the following steps: receiving, at a computer network, an access request from a client device; retrieving a user identification data associated with said client device; presenting a message over said client device, wherein the message contains details associated with said access request; responsive to the user confirmation of said details, initiating an MFA process, wherein the MFA process comprises presenting an authentication message over the client device; and only in a case that the user has been authenticated by the MFA process, establishing the requested connection access.

15 Claims, 7 Drawing Sheets

100A

Related U.S. Application Data

(60) Provisional application No. 62/822,903, filed on Mar. 24, 2019.

(52) U.S. Cl.
CPC ......... *G06F 21/31* (2013.01); *H04L 63/0838* (2013.01); *H04L 2463/082* (2013.01)

(58) Field of Classification Search
CPC ..... H04L 2463/082; H04L 9/40; G06F 21/30; G06F 21/31; G06F 21/44; G06F 21/62
See application file for complete search history.

(56) References Cited

U.S. PATENT DOCUMENTS

| | | | |
|---|---|---|---|
| 10,321,316 B1 | 6/2019 | Belton, Jr. | |
| 10,505,939 B2* | 12/2019 | Keeler | H04L 41/00 |
| 10,547,600 B2* | 1/2020 | Murthy | H04L 63/0236 |
| 10,701,049 B2* | 6/2020 | Murthy | H04L 63/08 |
| 2007/0094716 A1* | 4/2007 | Farino | H04L 63/101 |
| | | | 726/5 |
| 2007/0250920 A1* | 10/2007 | Lindsay | G06F 21/31 |
| | | | 726/7 |
| 2008/0189776 A1* | 8/2008 | Constable | H04W 12/065 |
| | | | 726/7 |
| 2014/0208406 A1* | 7/2014 | Austin | H04L 63/0272 |
| | | | 726/7 |
| 2014/0250504 A1 | 9/2014 | Hung | |
| 2015/0358205 A1 | 12/2015 | Brophy | |
| 2016/0371475 A1* | 12/2016 | Zhao | H04L 63/08 |
| 2018/0097787 A1 | 4/2018 | Murthy | |
| 2019/0116193 A1 | 4/2019 | Wang | |

* cited by examiner

100A

METHOD AND SYSTEM FOR DELEGATING CONTROL IN NETWORK CONNECTION ACCESS RULES USING MULTI-FACTOR AUTHENTICATION (MFA)

CROSS-REFERENCE TO RELATED APPLICATIONS

This application is a continuation-in-part of U.S. patent application Ser. No. 16/828,426, filed on Mar. 24, 2020, which claims the benefit of U.S. Provisional Patent Application No. 62/822,903, filed Mar. 24, 2019, both of which are hereby incorporated by reference in their entirety.

FIELD OF THE INVENTION

The present invention relates generally to the field of computer networks and, more particularly, to network access management.

BACKGROUND OF THE INVENTION

When a remote computer (hereinafter, a source computer) connects to a computer network (hereinafter a target computer) of a business or an organization, it is desirable to be able to automatically grant access to the network without the need to configure the network connection between the source computer and the target each and every time.

Multi-factor authentication (MFA) is an authentication method in which the identity of a user is confirmed, and the user is granted access at the application layer to some resource only after successfully presenting at least two factors of evidence to an authentication mechanism. For example, an MFA for an Internet website may require a username and password to be entered into the website, followed by entry of a text message sent to a smartphone that is associated with the user who has accessed the website.

While current MFA is used to grant access on the application layer, accessing a target computer from a source computer on a network layer cannot be implemented easily without a set of ever-changing rules that are applied differently to each and every user. The main reason is that managing network access rules requires the involvement of IT professionals in managing and modifying these rules on a daily basis, making it impractical for a large number of users.

SUMMARY OF THE INVENTION

Some embodiments of the present invention address the aforementioned challenges of granting network access to source computers by providing a method of managing network connection access by modifying network access rules based on multi factor authentication (MFA).

In some embodiments, the method may include the following steps: receiving, at a service, an access request directed at network access to a target computer, from a source computer associated with a user, wherein the source computer is blocked from network access to the target computer; presenting the user with a message containing a request to identify via a multi factor authentication (MFA) process; and granting the source computer with network access to the target computer, only in a case that the user has been authenticated by the MFA process.

In some embodiments, the method may include the following steps: receiving, at a portal, an explicit request from a user to grant a network access to one or more target computers; responsive to the explicit request, presenting a user with a message containing a request to identify via a multi factor authentication (MFA) process, wherein the user is associated with a source computer that is blocked from network access to the one or more target computers; and granting the source computer network access to the one or more target computers, only in a case that the user has been authenticated by the MFA process.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
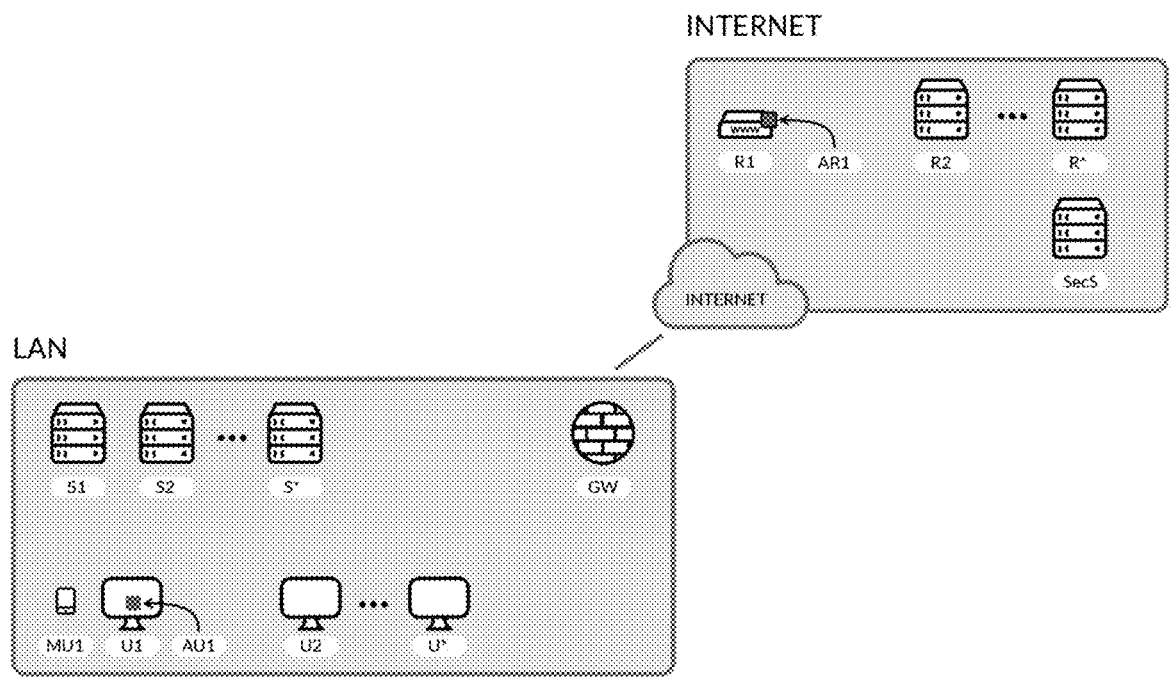
FIG. 1A is a block diagram illustrating non-limiting exemplary architecture of a system in accordance with some embodiments of the present invention.

It will be appreciated that, for simplicity and clarity of illustration, some elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as is apparent from the following discussions, it is appreciated that throughout the specification discussions utilizing terms such as "processing", 'computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Two main embodiments of the present invention are provided herein. According to the first embodiment, the interaction between the source computer and the target computer is reactive, meaning, the user is accessing the target machine from its source machine and an MFA is initiated automatically.

According to the second embodiment, the interaction between the source computer and the target computer is proactive, meaning the user is accessing a portal (or some more generic term) from its source machine and explicitly grants itself access to a target machine.

According to some embodiments of the present invention, a system may include: a source computer; a target computer; and a service which receives an access request directed at said target computer, from said source computer associated with a user, wherein the source computer is blocked from network access to the target computer, wherein said service presents the user with a message containing a request to identify the user via a multi factor authentication (MFA) process, and wherein the service further grants the source computer network access to the target computer, only in a case that the user has been authenticated by the MFA process.

In accordance with some embodiments of the present invention, a network access comprises access or communication over the network layer in the sense of the seven layers computer network model or a similar model. The network access layer is used herein in contrast to application layer access.

According to other embodiments of the present invention, a system may include: a source computer; one or more target computers; and a portal which receives explicit request from a user to grant a network access to the one or more target computers, wherein the portal presents the user with a message containing a request to identify the user via a multi factor authentication (MFA) process, responsive to the explicit request, wherein the user is associated with the source computer that is blocked from network access to the one or more target computers, and wherein the portal grants the source computer with network access to the least one target computer, only in a case that the user has been authenticated by the MFA process.

Some embodiments of the present invention are directed to connections initiated by one machine to any other machine or resource. The connection may include any point of time between initiating the connection, through an optional resolution by a Domain Name Server (DNS) and until the establishment of the connection. The connection may be validated against the network security rules. In a case that the connection is not permitted by some existing rule, and this rule is allowed to be overridden by the MFA mechanism, then an MFA rule modification process may be initiated in order to enable the requested connection.

According to some embodiments of the present invention, a rule modification process using MFA is provided herein as detailed below.

According to some embodiments of the present invention, the communication initiator information (e.g., mobile phone number, smartphones MFA authentication applications) is retrieved from the system.

According to some embodiments of the present invention, the system presents a message to the initiator machine containing the requested connection details and asks the initiator to confirm the connection.

According to some embodiments of the present invention, in a case that the initiator confirms the connection message, the system initiates the following MFA process:

Knowledge: an authentication message is presented on the initiator machine, and the user is required to enter the authentication details such as username.

Possession: an authentication message is sent to the user's MFA devices (for example, mobile phone number, smartphone application), where the user is required to acknowledge the authentication message in one of the following methods: entering the challenge shown on the MFA device back to the initiator machine (for example, entering a one-time pin code sent to the phone and then entering it on the initiator machine); interacting with the MFA message on the MFA asset (for example, entering the phone's passcode in a MFA mobile application); and in a case that the initiator is a multi-purpose entity (e.g., an identity being used by multiple users), then the configurable security policy can suggest a captcha challenge (such as Re-captcha™).

It is understood that the aforementioned methods for acknowledging the authentication are merely examples, and any other known method may be used herein instead.

According to some embodiments of the present invention, in a case that the user is authenticated using the MFA process, the requested connection is permitted, and the security rule is overridden for a predefined time period (such as that configurable by the system administrator).

Possible predefined time periods may include: One time—this requested connection only; Limited time—future similar connections for a predetermined time window; and Unlimited time—future similar connections without time limitations.

According to some embodiments of the present invention, entering the challenge shown on the MFA device back to the initiator machine (for example, entering a one-time pin code sent to the phone and then entering it on the initiator machine).

Interacting with the MFA message on the MFA asset (for example, entering the phone's passcode in an MFA mobile application).

If the initiator is a multi-purpose entity (e.g. an identity being used by multiple users), then the configurable security policy can suggest a captcha challenge (such as Re-captcha™).

FIG. 1A is a block diagram illustrating an exemplary architecture 100A in accordance with some embodiments of the present invention. Every organization asset has a software agent (AU) of the Security System (SecS) server (computer) installed, wherein each of S1, S2, ... S*—represent a server inside the LAN (Local Area Network), and wherein each of U1, U2, ... U* represent a personal computer (machine) inside the LAN R1, R2, ... R* represent servers accessed via Internet connectivity. GW represent a gateway device (router) to access external networks. MU1 represents a mobile phone used as an MFA (Multi Factor Authentication) token and associated with U1. AU1 represents Security System (SecS) software agent installed on U1. AR1 represents SecS software agent installed on RE Security System (SecS)—representing SecS Platform cloud services. The security system includes one or more computers, including servers and the like, which manage MFA overrides for the security rules.

It should be noted that all of the aforementioned components are network independent and can be on LAN or in the cloud.

In operation, AU1 is installed on U1 and reports to SecS. AU1 enters "Learning Mode" in which it observes the outgoing network connections to any other LAN or WAN assets (e.g. U2, S1, R1) and based on the learnt behavior, constructs a baseline of variant network rules. U1 is accessing only 3 resources as follows: HTTP access to R2; RDP access to asset U2; and SMB access to S.

In accordance with some embodiments of the present invention, after some pre-configured learning period, AU1 has constructed a baseline for U1. U1 enters "Preventive Mode"—intercepts outgoing network connections to any other LAN or WAN assets (e.g. U2, S1, R1) and validating it against the constructed baseline. Following is an exemplary baseline illustrating how it may look like:

ALLOW HTTP FROM U1 TO R2
ALLOW RDP FROM U1 TO U2
ALLOW SMB FROM U1 TO S1

Figure 1B:
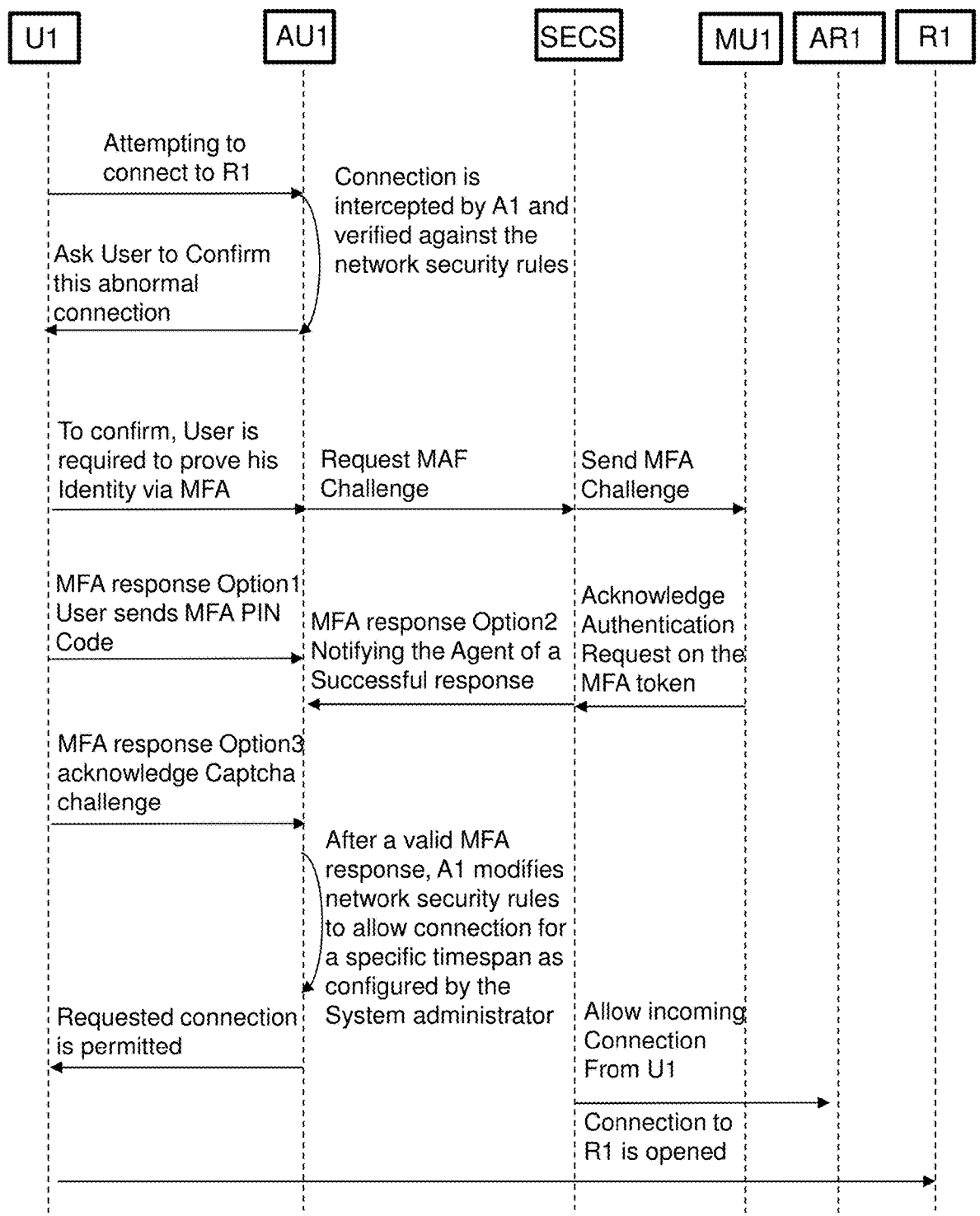
FIG. 1B is a high-level flowchart illustrating a non-limiting exemplary computer-implemented method in accordance with some embodiments of the present invention.

FIG. 1B is a high-level flowchart illustrating a non-limiting exemplary computer-implemented method 100B in accordance with some embodiments of the present invention. U1 may attempt to access R1 via HTTP. This network connection is considered abnormal and is not permitted as it is not in any allow rule (that was either learnt automatically by the SecS or configured manually by the SecS administrator).

In accordance with some embodiments of the present invention, AU1 may present the user an interactive prompt asking if the user initiated this connection and informs the user that, in order to get access to R1, the user is required to authenticate with an additional MFA.

In accordance with some embodiments of the present invention, the user agrees to carry out MFA, and AU1 is notifying SecS which in turn sends an MFA challenge to MU1—depending on the configuration, this could be an SMS (short message service) message containing a one-time-code or any conventional MFA method used by the organization already. For the purpose of this example, it will be assumed that a one-time code is sent via an SMS message to U1.

In accordance with some embodiments of the present invention, the user manually types the one-time code to an input field on AU1. In response, AU1 validates with SecS the user input for the one-time code. If the one-time code matches the one sent, SecS sends an authorization message to AU1 and AR1. AU1 and AR1 both modify the network security rules to allow connection for a specific timespan as configured by the SecS administrator, and consequently the connection to R1 is opened.

In accordance with some embodiments of the present invention, AU1 presents the user with an interactive prompt asking if the user initiated this connection and informs the user that, in order to get access to U1, the user is required to authenticate with an additional MFA.

In consequence: the malware has no access to the user's MFA device; the MFA process fails; and the connection to U2 is denied.

In accordance with some embodiments of the present invention, when a malware installed on U1 is attempting to access U2 via HTTP, the flow is as follows. This network connection is considered abnormal and is not permitted, as it is not in any allowed rule (that was either learned automatically by the SecS or configured manually by the SecS administrator).

Figure 2A:
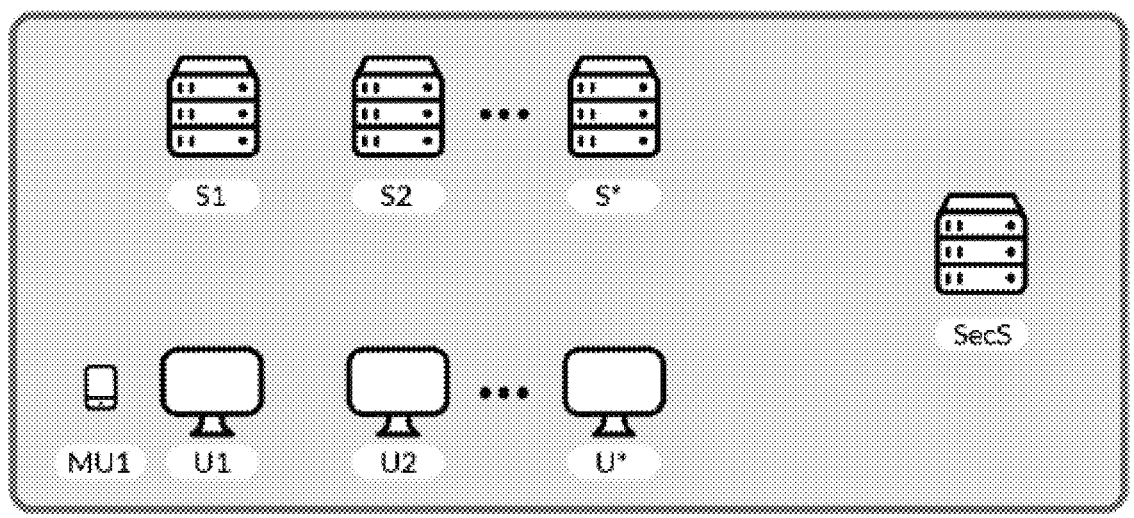
FIG. 2A is a block diagram illustrating non-limiting exemplary architecture of a system in accordance with other some embodiments of the present invention.

FIG. 2A is a block diagram illustrating an exemplary architecture 200A in accordance with some embodiments of the present invention. In this embodiment, the system is agentless and there is an on-premise server with high privileges to remotely manage each entity's security rules. S1, S2, . . . S* representing a server inside the LAN. U1, U2, . . . U*—representing a personal computer inside the LAN. MU1—representing a mobile phone used as an MFA token and associated with U. SecS—representing Security System Platform on premise server inside the LAN. It should be noted that all of the components listed herein are network independent and can be on LAN or in the cloud.

Figure 2B:
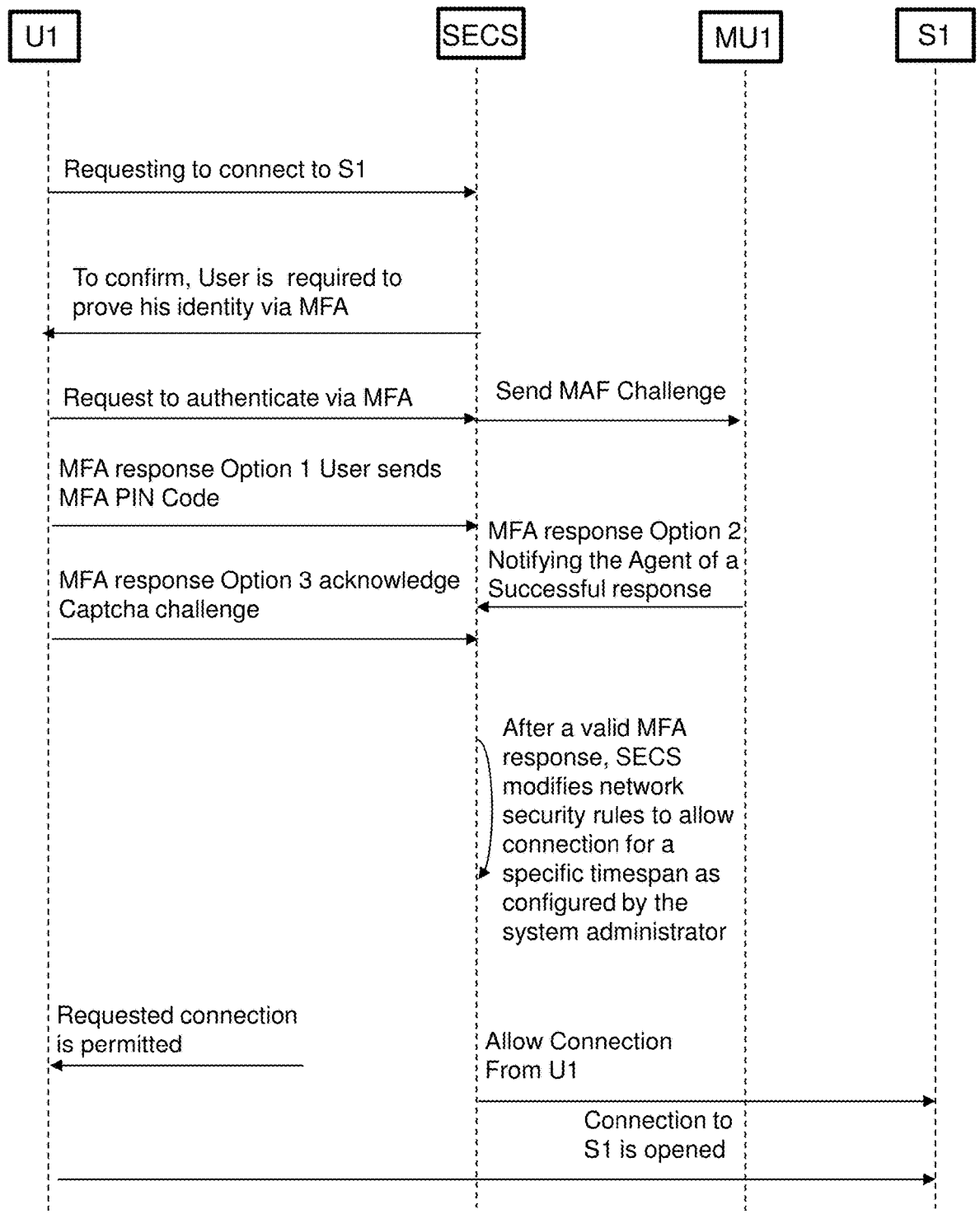
FIG. 2B is a high-level flowchart illustrating a non-limiting exemplary computer-implemented method in accordance with other embodiments of the present invention.

FIG. 2B is a high-level flowchart illustrating a non-limiting exemplary computer-implemented method 200B in accordance with some embodiments of the present invention.

U1 attempts to access S1, but the connection is blocked. User opens a web browser and navigates to SECS management. On SecS management web interface, the user is granting access from U1 to S1, and SecS informs the user that, in order to get access to S1, the user is required to authenticate with an additional MFA.

In accordance with some embodiments of the present invention, once the user agrees to carry out an MFA, the SecS sends an MFA challenge to MU1, depending on the configuration this could be an SMS message containing a one-time-code or any conventional MFA method used by the organization already. For the purpose of this example, it is assumed that a one-time code is sent via an SMS message to U1.

In accordance with some embodiments of the present invention, in response to the user manually typing the one-time code to an input field in the web interface, the SecS validates the user input for the one-time code.

In a case that the one-time code matches the one sent, SecS remotely connects to S1 and modifies the network security rules to allow connection from U1. Thereafter, the connection to S1 is opened, and U1 successfully connects to S1.

In accordance with some embodiments of the present invention, after a specific timespan, as configured by the SecS administrator 1, SecS remotely connects to S1 and modifies the network security rules to deny connection from U1.

Figure 3A:
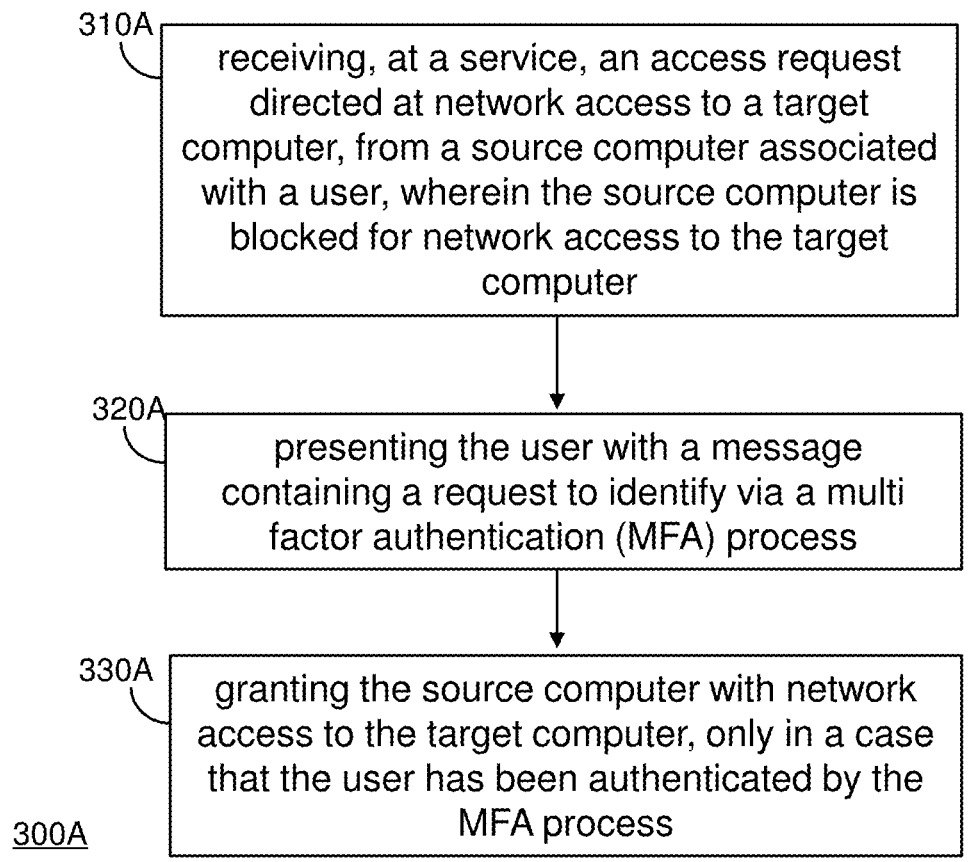
FIG. 3A is a high-level flowchart illustrating a non-limiting exemplary computer-implemented method in accordance with one embodiment of the present invention.

FIG. 3A is a high-level flowchart illustrating a non-limiting exemplary method 300A in accordance with a second embodiment of the present invention implementing a reactive interface for managing network access. Method 300A may include the following steps: receiving, at a service, an access request directed at network access to a target computer, from a source computer associated with a user, wherein the source computer is blocked from network access to the target computer 310A; presenting the user with a message containing a request to identify via a multi factor authentication (MFA) process 320A; and granting the source computer with network access to the target computer, only in a case that the user has been authenticated by the MFA process 330A.

Figure 3B:
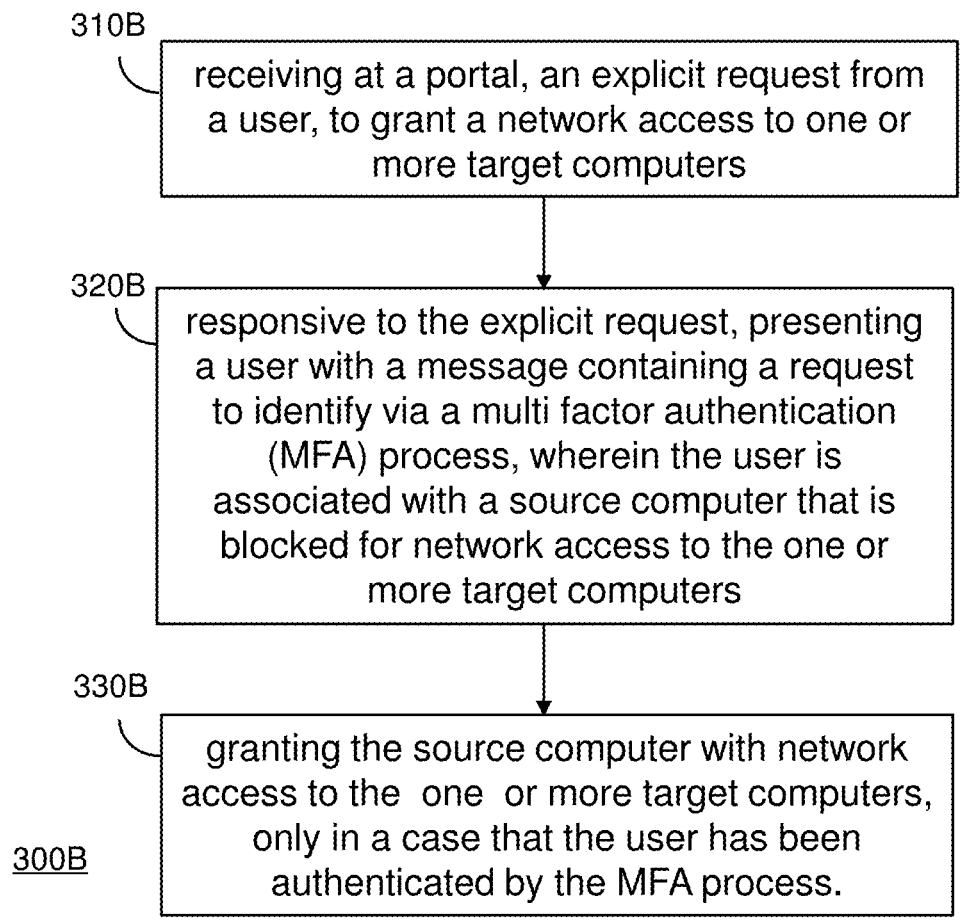
FIG. 3B is a high-level flowchart illustrating a non-limiting exemplary computer-implemented method in accordance with another embodiment of the present invention.

FIG. 3B is a high-level flowchart illustrating a non-limiting exemplary method 300B in accordance with the second embodiment of the present invention implementing a proactive interface for managing network access. Method 300B may include the following steps: receiving at a portal, an explicit request from a user to grant a network access to one or more target computers 310B; responsive to the explicit request, presenting a user with a message containing a request to identify via a multi factor authentication (MFA)

process, wherein the user is associated with a source computer that is blocked from network access to the one or more target computers 320B; and granting the source computer with network access to the one or more target computers, only in a case that the user has been authenticated by the MFA process 330B.

Figure 4:
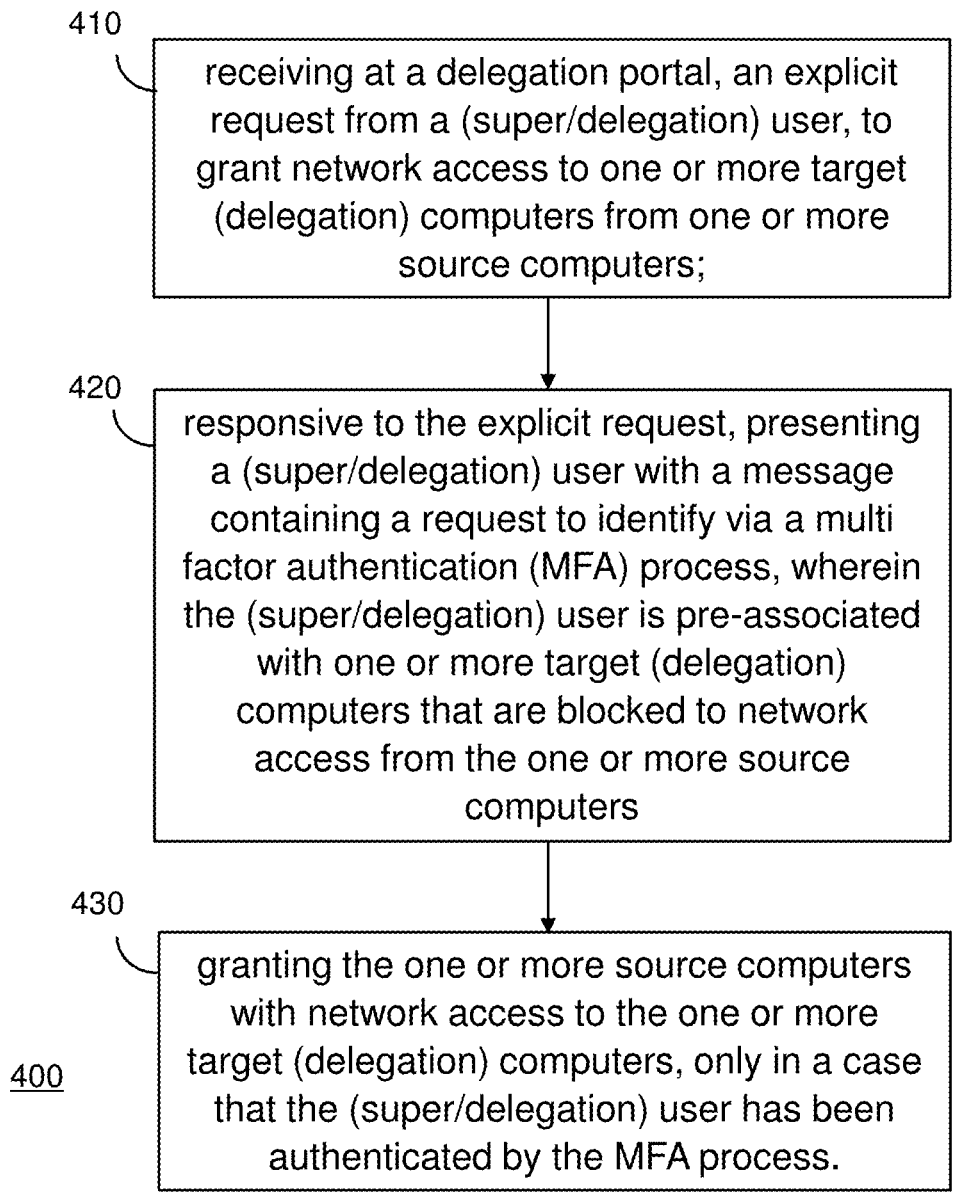
FIG. 4 is high-level flowchart illustrating a method in accordance with yet another embodiment of the present invention.

FIG. 4 is a high-level flowchart illustrating a non-limiting exemplary method 400 in accordance with the second embodiment of the present invention implementing a proactive interface for managing network access where a super user, or delegating user, is associated with the source computer. This is carried out via a delegating portal and to delegating target computers, which may or may not be in a prior association relationship with the super user.

Method 400 may include: receiving at a delegation portal, an explicit request from a (super/delegation) user, to grant network access to one or more target (delegation) computers from one or more source computers 410; responsive to the explicit request, presenting a (super/delegation) user with a message containing a request to identify via a multi factor authentication (MFA) process, wherein the (super/delegation) user is pre-associated with one or more target (delegation) computers that are blocked to network access from the one or more source computers 420; and granting the one or more source computers with network access to the one or more target (delegation) computers, only in a case that the (super/delegation) user has been authenticated by the MFA process 430.

According to some embodiments of the present invention, the granting of the source computer with network access to the at least one target computer may include unblocking the source computer for network access to the at least one target computer. The granting of the network access may be carried out by any designated network element such as a dedicated server or computer.

According to some embodiments of the present invention, the at least one source computer and the at least one target computer have at least one local firewall installed thereon. The unblocking of the source computer for network access to the at least one target computer may include changing access rules on the at least one local firewall of either source or target computers or both.

It should be noted that methods 300A, 300B, and 400 according to some embodiments of the present invention may be stored as instructions in a computer readable medium to cause processors, such as central processing units (CPU) to perform the method. Additionally, the methods described in the present disclosure can be stored as instructions in a non-transitory computer readable medium, such as storage devices which may include hard disk drives, solid state drives, flash memories, and the like. Additionally, non-transitory computer readable medium can be memory units.

In order to implement a method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, JavaScript Object Notation (JSON), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or like those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for network connection access rules using multi factor authentication (MFA) comprising:
   receiving at a portal, an explicit request from a user, to grant a network access to at least one target computer from among a plurality of target computers;
   responsive to the explicit request, presenting the user with a message containing a request to identify via a multi factor authentication (MFA) process, wherein the user is associated with at least one source computer from among a plurality of source computers that is blocked for network access to the at least one target computer by network security rules at said at least one target computer which are controlled by said portal which is implemented as a server at said computer network, said server having privileges to remotely manage network security rules of each one of the plurality of source computers and of each one of the plurality of target computers; and
   granting the at least one source computer with network access to the at least one target computer, only in a case that the user has been authenticated by the MFA process by modifying said network security rules by the server, to allow the connection to the at least one target computer.

2. The method according to claim 1, wherein the user is a super user and wherein the portal is a delegation portal and wherein the at least one target computer comprises a delegation computer.

3. The method according to claim 2, wherein the super user is pre-associated with at least one of the delegation computers that are blocked to network access from the at least one source computer.

4. The method according to claim 1, wherein the granting of the source computer with network access to the at least one target computer comprises unblocking said source computer for network access to the at least one target computer.

5. The method according to claim 4, wherein the at least one source computer and the at least one target computer have at least one local firewall installed thereon, and wherein the unblocking said source computer for network access to the at least one target computer comprises changing access rules on the at least one local firewall.

6. A system for network connection access rules using multi factor authentication (MFA) comprising:
   a portal configured to receive an explicit request from a user, to grant a network access to at least one target computer from among a plurality of target computers;
   a user interface which responsive to the explicit request, is configured to present the user with a message containing a request to identify via a multi factor authentication (MFA) process, wherein the user is associated with at least one source computer from among a plurality of source computers that is blocked for network access to the at least one target computer by network security rules at said at least one target computer which are controlled by said portal which is implemented as a server at said computer network, said server having privileges to remotely manage network security rules of each one of the plurality of source computers and of each one of the plurality of target computers; and
   a network element configured to grant the at least one source computer with network access to the at least one target computer, only in a case that the user has been authenticated by the MFA process by modifying said network security rules by the server, to allow the connection to the at least one target computer.

7. The system according to claim 6, wherein the user is a super user and wherein the portal is a delegation portal and wherein the at least one target computer comprises a delegation computer.

8. The system according to claim 7, wherein the super user is pre-associated with at least one of the delegation computers that are blocked to network access from the at least one source computer.

9. The system according to claim 6, wherein the granting of the source computer with network access to the at least one target computer comprises unblocking said source computer for network access to the at least one target computer.

10. The system according to claim 9, wherein the at least one source computer and the at least one target computer have at least one local firewall installed thereon, and wherein the unblocking said source computer for network access to the at least one target computer comprises changing access rules on the at least one local firewall.

11. A non-transitory computer readable medium comprising a set of instructions for network connection access rules using multi factor authentication (MFA) that, when executed, cause at least one computer processor to:
   receive at a portal, an explicit request from a user, to grant a network access to at least one target computer from among a plurality of target computers;
   responsive to the explicit request, present the user with a message containing a request to identify via a multi factor authentication (MFA) process, wherein the user is associated with at least one source computer from among a plurality of source computers that is blocked for network access to the at least one target computer by network security rules at said at least one target computer which are controlled by said portal which is implemented as a server at said computer network, said server having privileges to remotely manage network security rules of each one of the plurality of source computers and of each one of the plurality of target computers; and
   grant the at least one source computer with network access to the at least one target computer, only in a case that the user has been authenticated by the MFA process by modifying said network security rules by the server, to allow the connection to the at least one target computer.

12. The non-transitory computer readable medium according to claim 11, wherein the user is a super user and wherein the portal is a delegation portal and wherein the at least one target computer comprises a delegation computer.

13. The non-transitory computer readable medium according to claim 12, wherein the super user is pre-associated with at least one of the delegation computers that are blocked to network access from the at least one source computer.

14. The non-transitory computer readable medium according to claim 11, wherein the granting of the source computer with network access to the at least one target computer comprises unblocking said source computer for network access to the at least one target computer.

15. The non-transitory computer readable medium according to claim 14, wherein the at least one source computer and the at least one target computer have at least one local firewall installed thereon, and wherein the unblocking said source computer for network access to the at least one target computer comprises changing access rules on the at least one local firewall.

\* \* \* \* \*